M. A. CAMERON.
ECCENTRIC STEERING DEVICE FOR MOTOR VEHICLES.
APPLICATION FILED AUG. 3, 1921.
1,418,698.
Patented June 6, 1922.
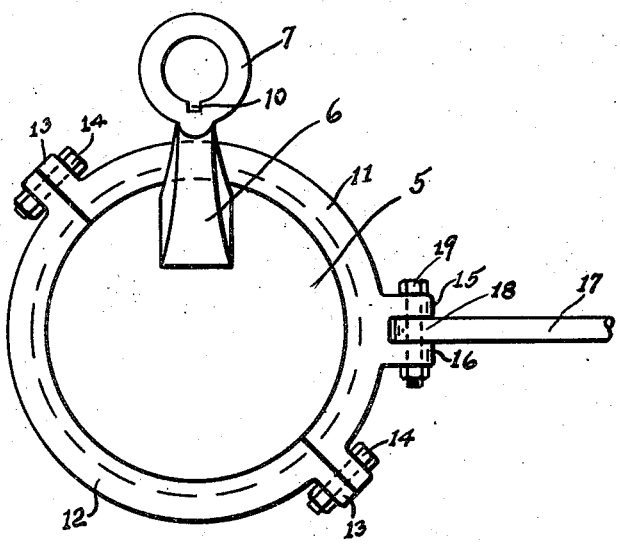
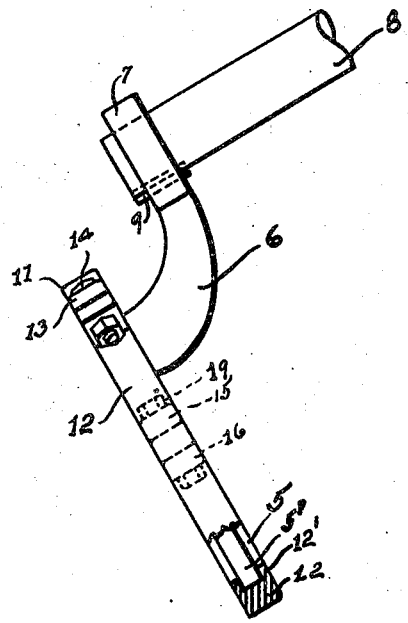
Monroe A. Cameron
INVENTOR.
BY Erwin Wheeler & Woolard
ATTORNEYS.

UNITED STATES PATENT OFFICE.

MONROE A. CAMERON, OF BROADVIEW, MONTANA.

ECCENTRIC STEERING DEVICE FOR MOTOR VEHICLES.

1,418,698.  Specification of Letters Patent.  Patented June 6, 1922.

Application filed August 3, 1921. Serial No. 489,466.

*To all whom it may concern:*

Be it known that I, MONROE A. CAMERON, a citizen of the United States, residing at Broadview, county of Yellowstone, and State of Montana, have invented new and useful Improvements in Eccentric Steering Devices for Motor Vehicles, of which the following is a specification.

This invention relates to steering devices for motor vehicles and more particularly to that portion of the steering gear of a motor vehicle which converts the rotary motion of the steering wheel and shaft to reciprocatory motion, whereby the front wheels of the vehicle may be directed.

It is the object of this invention to provide an inexpensive steering gear unit which will operate upon an eccentric and which may be substituted for the corresponding portions of reversible steering gears now in use in small cars to make the steering gears of such cars comparatively irreversible.

It is a further object of this invention to provide an eccentric steering gear unit capable of being used in the confined space available in certain types of vehicles which are at present equipped with a reversible steering gear.

In the drawings:

Fig. 1 is a rear elevation of a device illustrating an embodiment of this invention.

Fig. 2 is a side elevation of the same.

Like parts are identified by the same reference characters throughout the several views.

The device comprises a circular eccentric member 5 which is provided near its periphery with the L-shaped post 6. This post is provided with an apertured head 7 adapted to receive the end of the steering shaft 8. A key 9 inserted into the key way 10 of head 7 and into a corresponding recess in the steering shaft 8 serves to retain the device in place upon the end of said shaft.

The disklike eccentric member 5 is embraced between the straps 11 and 12 which are provided with lips 13, engaged by bolts 14, to clamp the straps into place upon the exterior of the eccentric disk.

Any suitable bearing may be provided for between the disk and the straps 11 and 12. If desired, the straps may be grooved as at 12' in Fig. 2 to receive a circumferential rib 5' upon the disk and thereby to hold the disk against displacement when the device is assembled. It is also possible to provide a ball or roller bearing between the eccentric and the straps. Other means for providing a suitable retaining bearing between these parts will occur to those skilled in the art.

Integral with the strap member 11 is a tie rod connection comprising a pair of spaced parallel ears 15 and 16. The rod 17 is provided with an eye 18 in its end which is adapted to be received between ears 15 and 16. A pivot bolt 19 passed through the ears and the eye 18 binds the parts together in a flexible connection. The function of the tie rod 17 is to communicate the motion imparted to the strap member 11 by means of the eccentric disk 5 to the steering arms upon the dirigible axles (not shown) of the vehicle.

It has been found that by using an eccentric upon the end of a steering shaft and imparting motion by means of the eccentric and a strap carried thereby to the steering axles that steering may be accomplished with the greatest ease and without subjecting the chauffeur of the vehicle to road shocks. In other words, a steering gear in which an eccentric is incorporated becomes practically irreversible.

A great many motor vehicles, such as Fords and other light and low priced cars, are equipped when sold with reversible steering mechanism which transmits all of the road shocks freely through the steering mechanism to the considerable discomfort of the driver. In such cars, there is not enough room available for the mounting of an eccentric disk large enough to cause the entire requisite displacement of the steering wheels. It has therefore been thought impossible hitherto to provide a cheap form of irreversible steering mechanism for such cars. The present invention, however, by means of the L-shaped post 6, which is preferably made integral with the eccentric disk 5 and by which the device embodying this invention is supported from the steering shaft 8, makes possible the use of a much smaller disk while obtaining all the advantages which would flow from the use of a full-sized eccentric disk. The device as illustrated is capable of being installed in the limited space available in a Ford automobile. When installed, the eccentric disk 5 takes up road shocks without imparting them through the steering shaft 8 to the steering wheel. At the same time, the throw or amount of oscillation imparted to tie rod 17 is sufficient to turn the steering axles to the fullest extent permitted by the construction of the vehicle.

Attention is called to the simplicity of construction of the device and the accessibility of its parts whereby it is rendered suitable for installation by any car owner upon the car which he has been driving. The value of the device is therefore enhanced by reason of the fact that its installation is not a factory job.

I claim:

1. The combination with a steering shaft and a tie rod adapted to be oscillated thereby, of an L-shaped crank arm adapted to be secured to said shaft, an eccentric disk attached to the end of said crank arm, and motion transmitting connections between said eccentric and said tie rod.

2. The combination with a steering shaft and a tie rod adapted to be oscillated thereby, of an annular bearing member associated with said tie rod, a disk rotatable in said member, and a crank arm attached to said disk at a point other than its center and adapted to be secured at its free end to said steering shaft.

3. As a new article of manufacture, a disk provided with an L-shaped post projecting from its face at a point other than its center, said post being provided with an aperture adapted to receive the steering shaft and having an axis substantially parallel to that of the disk, said aperture being disposed at a point more remote from the axis of the disk than the base of said post, and a strap bearing for said disk, said bearing being provided with means whereby a tie rod may be attached thereto.

MONROE A. CAMERON.